(12) United States Patent
Lane

(10) Patent No.: US 6,269,457 B1
(45) Date of Patent: Jul. 31, 2001

(54) TECHNOLOGY REGRESSION AND VERIFICATION ACCEPTANCE METHOD

(75) Inventor: Harriet Lane, Mendham, NJ (US)

(73) Assignee: Testing Technologies, Inc., Mendham, NJ (US)

(*) Notice: Subject to any disclaimer, the term of this patent is extended or adjusted under 35 U.S.C. 154(b) by 0 days.

(21) Appl. No.: 09/585,527

(22) Filed: Jun. 1, 2000

(51) Int. Cl.[7] ........................................ G06F 11/00
(52) U.S. Cl. ........................................ 714/38; 714/48
(58) Field of Search .......................... 714/37, 38, 46, 714/47, 48, 57

(56) References Cited

U.S. PATENT DOCUMENTS

| | | | |
|---|---|---|---|
| 5,233,611 | * 8/1993 | Triantafyllos | 714/46 |
| 5,500,941 | * 3/1996 | Gil | 714/38 |
| 5,513,315 | * 4/1996 | Tierney | 714/37 |
| 5,539,877 | * 7/1996 | Winokur | 714/26 |
| 5,553,235 | * 9/1996 | Chen | 714/20 |
| 5,673,387 | * 9/1997 | Chen | 714/38 |
| 5,805,795 | * 9/1998 | Whitten | 714/38 |
| 5,871,539 | * 2/1999 | Schaffer | 714/38 |
| 5,892,947 | * 4/1999 | DeLong | 717/1 |
| 5,913,023 | * 6/1999 | Szermer | 714/38 |
| 6,002,869 | * 12/1999 | Hinckley | 717/4 |
| 6,014,760 | * 1/2000 | Silva | 714/46 |
| 6,061,643 | * 5/2000 | Walker | 702/123 |

OTHER PUBLICATIONS

Lee, Michelle "Algorithmic Analysis of the IMpacts of Changes to Object–oriented Software" IEEE, 0–7695–0774–3/00. copyright 2000.*

\* cited by examiner

*Primary Examiner*—Robert Beausoleil
*Assistant Examiner*—Bryce P. Bonzo

(57) ABSTRACT

A method for regression and verification of hardware, network, and/or software technology platforms to deliver acceptance status details. This method variously prepares instructions and components to support unique business customer environments and manages the regression verification of these environments. Errors, deviations, and recommendations for improvement, with full regression capabilities, are reported to the business user customer in a non-technical business format they can select and customize to receive acceptance status management reporting information.

9 Claims, 4 Drawing Sheets

Verification Information

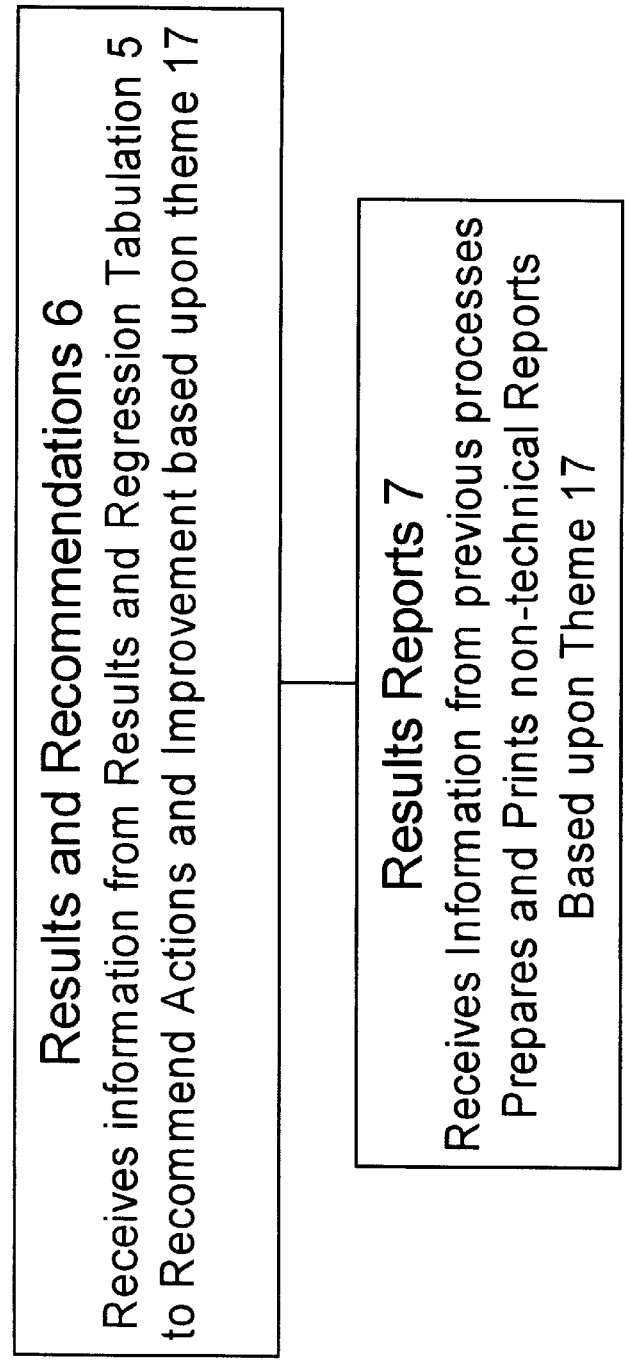

TECHNOLOGY REGRESSION AND VERIFICATION ACCEPTANCE METHOD

BACKGROUND

1. Field of Invention

This invention relates to Hardware, Network, and/or Software technology and the regression and verification of the accuracy of that technology; more particularly to a method for coordinating and managing the method and procedure, including full regression, to established generational baselines in order to provide errors, deviations, recommendations, and acceptance status information.

2. Description of Prior Art

Over many years of technology development a general methodology for testing and implementing technology has evolved:

Unit Test—Each individual technology, whether it be hardware, network, and/or software, is tested by its creator to demonstrate that it accurately and completely includes all the capability that was requested in the system requirements specification document, and that each technology item can be executed accordingly.

System Test—A group of hardware, network, and/or software technologies are collectively exercised by technical staff to demonstrate that it accurately and completely includes all the capability which was requested in the system requirement specification documents, and that the group can demonstrate accurate and complete processing as was requested. An Information Technologist testing organization typically conducts these tests.

Inter-System Test—An entire platform of hardware, network, and/or software technologies are collectively exercised to demonstrate that the platform accurately and completely includes all the capability which was requested in the system requirement specification documents. An Information Technologist testing organization typically conducts the inter-system tests.

System requirement specifications are prepared by members of technical organizations after they interpret the original business user customer requirement request and determine the technology and computer languages, machines, networks, routers, switches, and other hardware and network components that will be used to support the business user request.

User Acceptance Test—A support platform [or part of it] is collectively exercised to demonstrate that it accurately and completely includes all the capabilities that the business user customer requested in their original business user requirements request initially presented to the Information Technology organization. These tests are typically conducted by, or for business user customers, and they are not technology focused, rather they are exercised to verify that the business needs, transaction processing, and reporting exactly meets the business user's needs as they requested.

Usually the Unit, system, and Inter-System tests are expected to be completed by the Information Technology organization before it delivers the technology to the business user customer for the User Acceptance Test. All these tests should be correctly completed prior to implementing the new or enhanced technology into the operating production environment. On many occasions, however, the business user customer is unable to verify that the technology fulfills their original user request, generally due to their inability to conduct the acceptance verification process, timing constraints, late delivery, lack of available, and/or not having capable staff. Because the business user customer has been unable, in many instances to test the technology, it may be implemented into their production environment with errors that are detected after the production implementation. In a large number of, if not all, situations, these errors would have been identified during a full regression and user acceptance test.

Testing and the verification of accuracy and completeness of technology development are estimated to cost about 60 percent of the technology development budget. Inter-System and especially User Acceptance Testing, the more expensive and time consuming areas, are often shortened or eliminated in order to meet budget and delivery timeframes. Even though there can be significant costs incurred for later corrective actions which are borne by the same business user customer, these costs and the delays associated with corrective actions are now assessed after customer dissatisfaction, errors in transactions, and business delays.

Inventors have created various testing techniques to address the Unit, System, and Inter-System testing processes. These techniques appear to indicate that their use could improve testing, however these tests principally support technologists who are familiar with the complicated details required to build the hardware, network, and software technologies themselves. Importantly, these improvements test and verify the system specifications created by technologists after interpreting the original business user customer request, and therefore the technology developed, even if fully tested, may still not fulfill the original business user customer Requirement. In many cases these differences in interpretation are responsible for errors in the technology developed.

Business user acceptance verification processes in the User Acceptance Test are expected to affirm that the technology to be implemented delivers the business user customer's requested technology. In order to meet the intent of user acceptance testing noted above, however, methods require improvements to verify the technology accuracy, meet business user customer needs, improve business processes, reduce dissatisfaction, business expense and business delays.

U.S. Pat. No. 5,233,611 to Trienthafyllos, Shield, and IBM (1993), discloses automated function testing of application programs which utilizes a test case program which collects and executes commands and transactions. This method, however, does not include regression testing and it does not test hardware or network technologies. Nor does the method specifically support user acceptance by the non-technical business user customer community.

U.S. Pat. No. 5,513,315 to Tierney, Cross, and Microsoft (1996) shows a system and method for automatically testing software using a deterministic acceptance test and random command sequence selections with a results analyzer. This method uses specifically predetermined commands with a log file and tracker file to execute technologist oriented code level testing. Again, there is no regression component; nor are hardware and network elements tested. Evaluative intelligence is not included, and the method does not support user acceptance by the non-technical business user customer community.

U.S. Pat. No. 5,892,947 to DeLong, Carl, and Sun Microsystems (1999) is a test support tool which produces software test programs from logical descriptions and cause-effect graphs. This method generates code level test cases, as well. This method does not support regression testing, does not test hardware and network elements, does not include evaluative intelligence, and does not support user acceptance by the non-technical business user customer community.

U.S. Pat. No. 5,805,795 to Whitten and Sun Microsystems (1998) shows a method and computer program product for generating tests with optimized test cases and a selection method. Again, this method does not support regression testing and does not test hardware and network elements. The invention does not include evaluative intelligence and does not support user acceptance by the non-technical business user customer community.

U.S. Pat. No. 5,913,023 to Szermer and Siemens Corporate Research (1999) is a method for automated generation of tests for software. Again, this method does not support regression testing and does not test hardware and network elements. The invention does not include evaluative intelligence and does not support user acceptance by the non-technical business user customer community.

U.S. Pat. No. 6,002,869 to Hinckley and Novell, Inc. (1999) shows a system and method for automatically testing software programs. This method enables the functional testing of various code of a software program. Even though claim 4 in this invention states the method enables a test history of a test procedure, this is at a very detail program level, and is not regression testing. Also hardware and network components are not tested. Evaluative intelligence is not included, and the method does not support non-technical business user customer community.

U.S. Pat. No. 6,014,760 to Silva, et al. al, and Hewlett-Packard Company discloses a scheduling method and apparatus for a distributed automated testing system. This invention schedules and executes software tests. It does not test hardware and network components. The invention does not add evaluative intelligence, does not control regression, nor does it support users or manage test conditions.

U.S. Pat. No. 5,500,941 to Gil, and Ericsson, S. A. shows an optimum functional test method to determine the quality of a software system embedded in a large electronic system using usage concepts modeled as Markov chains. Code level test cases are generated internally, and are not those that would be selected by the business user customer. Regression testing is not covered here, nor are hardware and network components tested. The invention does not add evaluative intelligence and does not support the non-technical business user customer community.

U.S. Pat. No. 5,870,539 to Schaffer and Sun Microsystems (1999) discloses a method for generalized windows application install testing for use with an automated test tool. This invention tests windows software applications only; and no hardware or network. Regression testing is not included, evaluative intelligence is not included, and the process does not support user acceptance for non-technical business user customer community.

None of the above methods indicates the capability of performing a regression process to verify continuing process accuracy and integrity over time.

None of the above methods indicates the capability of clearly identifying errors, deviations, and specifically related recommendation for corrective action over time, the most important components of a verification process.

None of the above methods indicates they reduce time and costs when using their method.

None of the above methods indicates the ability to easily support the non-technical business user customer.

None of the above methods indicates the ability to customize [their methods] to support various different technology, hardware, network, and/or software components.

A method is needed to support non-technical business users and help them ensure their technology is correct and supports their business plans.

SUMMARY INCLUDING OBJECTS AND ADVANTAGES

This invention is a holistic method that manages hardware, network, and/or software regression and verification tasks and provides extensive evaluative acceptance results to business user customer communities. This method utilizes various techniques to build customizable components that support various specific business customer environments. Full regression and evaluative intelligence to established generational baselines and timeslices are major+ innovative capabilities of this method, greatly enhancing the ability of business user customers to manage their business, make informed management decisions, and reduce time and costs associated with implementing new technology.

The present invention offers distinct advantages to business user customers. Use of the customized components of this method enables the business user customer to timely and cost-effectively review their technology platforms utilizing the important regression capability to verify whether technology platforms continue to meet critical business needs and retain previously implemented capabilities over time. The components produce easy to read and use documentation that indicates generational platform information, particularly errors, deviations, recommendations, and acceptance management reports and metrics.

OBJECTS AND ADVANTAGES

Accordingly, the main object of this technology regression and verification acceptance invention is to enable a [non-technical] business user customer to insure that the technology they requested from their Information Technology (IT) organization was accurately and completely developed. This method provides the ability to assess currently requested technology, and iterations that were previously requested over time. Several objects and advantages of this invention are:

(a) to provide a method for maintaining and managing a generational set of baselines and timeslices 11 enabling the ability to verify continuing processing integrity over time. The significant advantage of these generational baselines and timeslices 11 of this invention is they form the basis and support mechanism for full regression review and evaluation.

(b) to provide evaluative and comparative information to a business user customer documenting the level of accuracy and completeness of their technology support platform. An important advantage of this component of the invention is that key constructs 12 and platform tasks 18 are related to the generational regression baselines and timeslices 11, and theme 17 to relate error and deviation information 14, recommendations 15, metrics 16, and results reports 17, which is meaningful to the business user customer community.

(c) to disclose errors or deviations 14 in a non-technical and customized way to make it easy for the business user customer to understand what has happened. The advantages of this component of the invention is that it enables the identification of unanticipated differences which can then be classified and presented to the business user customer in customized selected ways.

(d) to provide recommendations 15 for corrective action related to errors and deviations 14 that recommendations how business user customers might proceed and assist them and their Information technologist partners in addressing and correcting inconsistencies. The great advantages of the recommendation process is it develops recommended actions and improvements based upon preparatory work contained in defined criteria 30, thus including the business user customer fully in the process.

(e) To serve the business user customer in a timely, cost effective, and non-technical way. Accordingly, Information is presented to business user customers associated with processing information they are familiar with, their existing production operation information contained in reports, files, on screens, and in documents. Depending on defined criteria, this information can be prepared in timeslices, by process, and/or by error and deviation. Metrics 16 can also be presented in these selected groupings. The methods of this invention can demonstrate time and cost savings and track them with customizable selected metrics.

BRIEF DESCRIPTION OF THE DRAWINGS

FIG. 4 is a high level view of the Recommendations and Reporting Functions of this invention. These items contain the acceptance information used to make key business decisions.

REFERENCE NUMERALS

Figure 1:
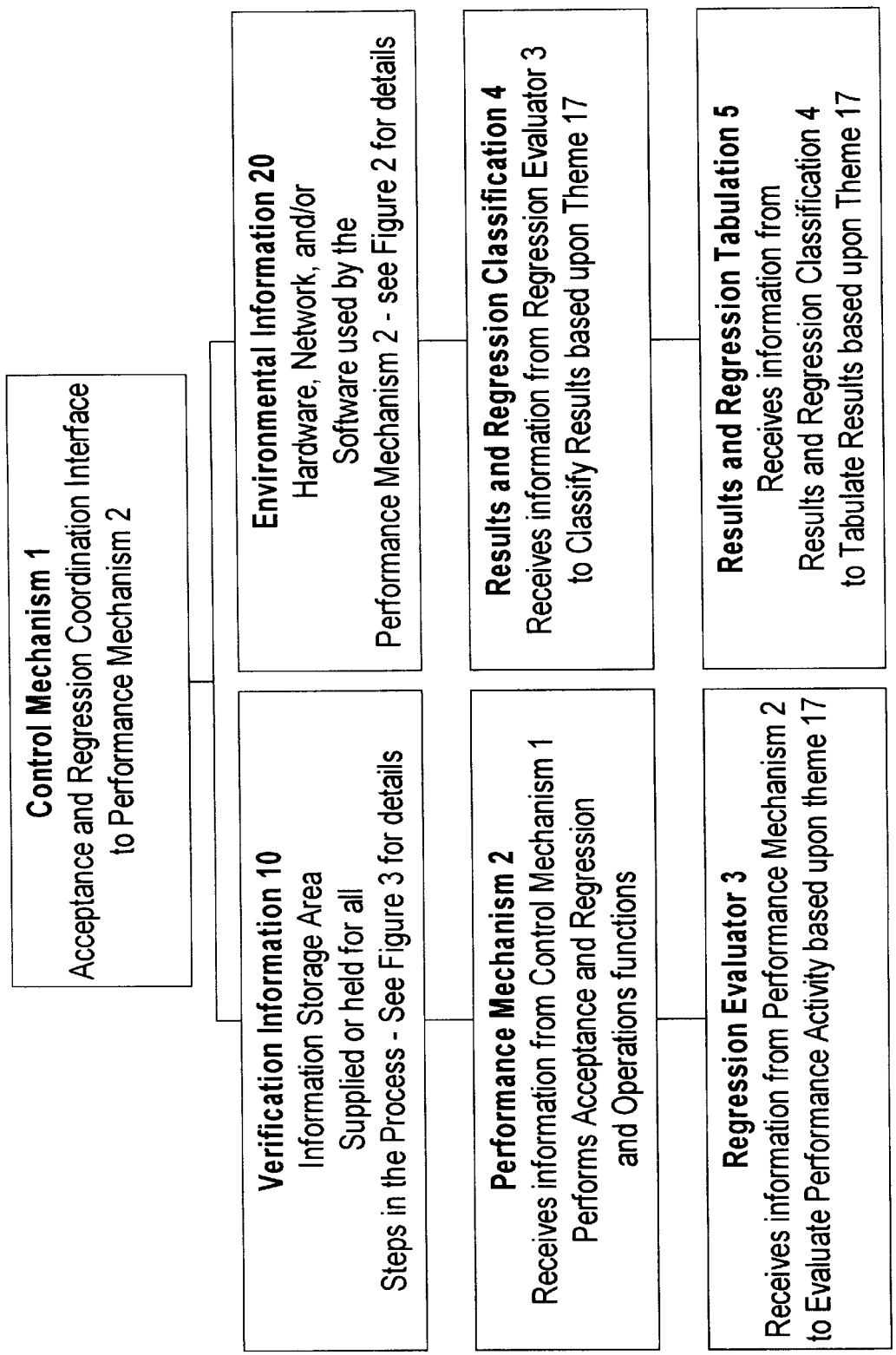
FIG. 1 is a high level view of the component activities of this invention's regression and verification processes including control, performance, regression, evaluation, classification, and tabulation.
Figure 2:
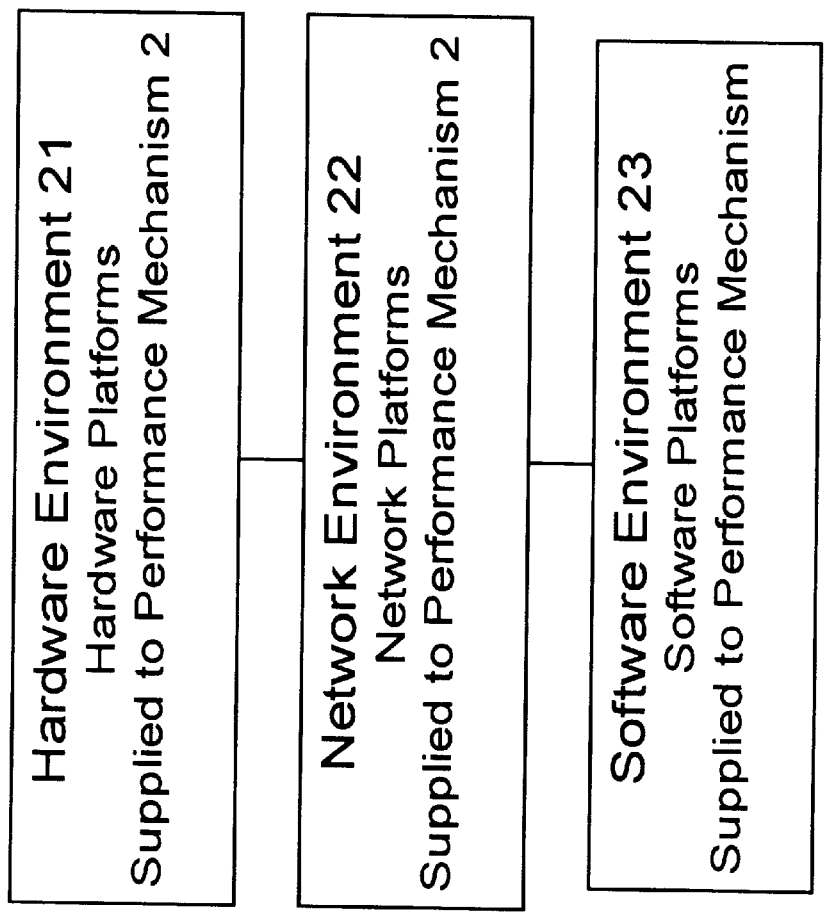
FIG. 2 is a high level view of the Environmental Information of this invention These are the sub-components of FIG. 1, step 2B.
Figure 3:
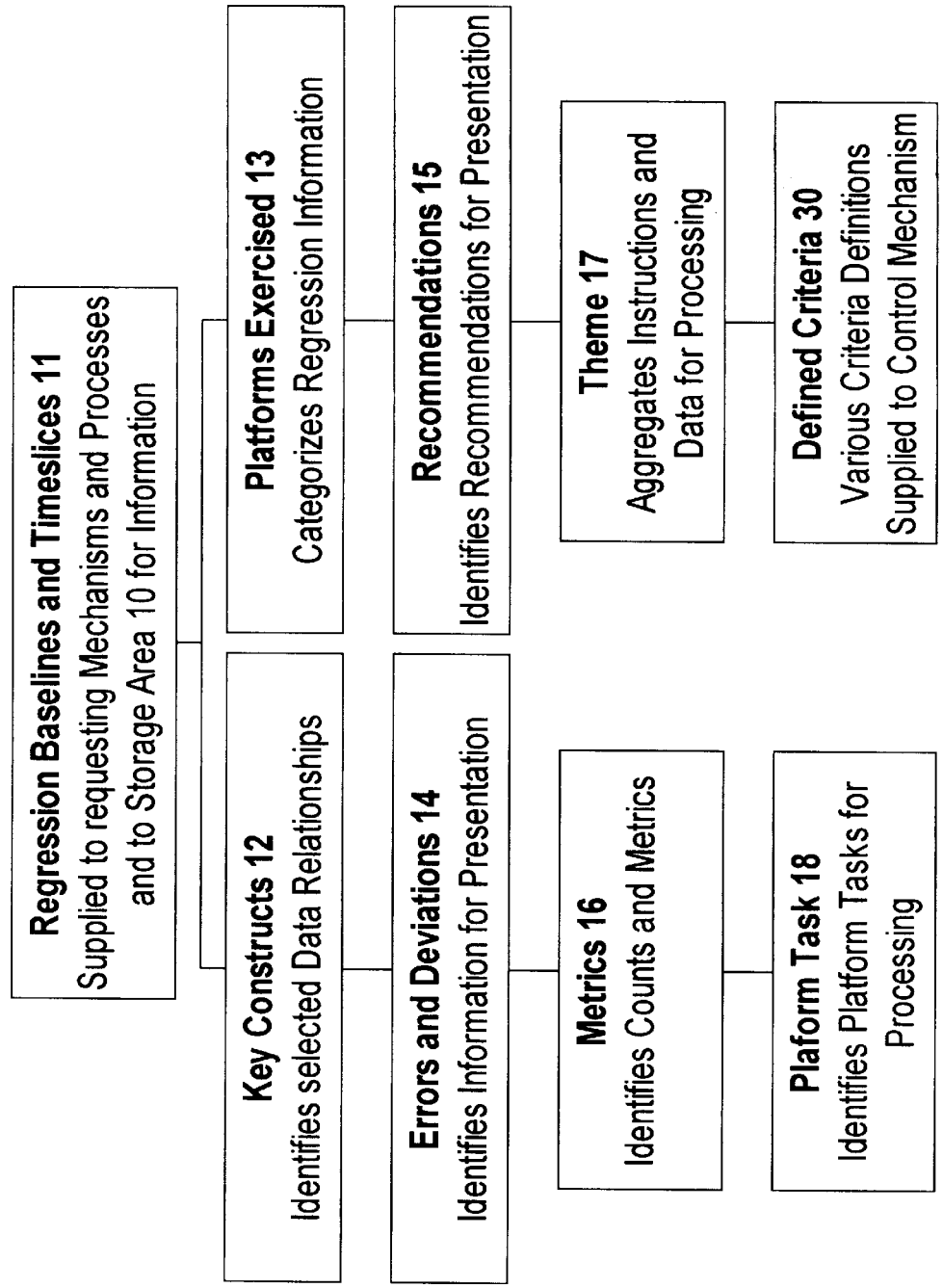
FIG. 3 is a high level view of the verification Information of this invention. These are sublevel components of FIG. 1 step 2A.

| Reference Numerals | Drawing Cross Reference |
| --- | --- |
| 1 | FIG. 1 Step 1 Control Mechanism |
| 2 | FIG. 1 Step 2 Performance Mechanism |
| 3 | FIG. 1 Step 3 Regression Evaluator |
| 4 | FIG. 1 Step 4 Results and Regression Classification |
| 5 | FIG. 1 Step 5 Results and Regression Tabulation |
| 6 | FIG. 4 Step 6 Results and Recommendation Process |
| 7 | FIG. 4 Step 7 Results Reports |
| 10 | FIG. 1 Step 10 Storage Area, Refer to FIG. 3 |
| 11 | FIG. 3 Step 11 Regression Baselines and Timeslices |
| 12 | FIG. 3 Step 12 Key Constructs |
| 13 | FIG. 3 Step 13 Platforms Exercised |
| 14 | FIG. 3 Step 14 Errors and Deviations |
| 15 | FIG. 3 Step 15 Recommendations |
| 16 | FIG. 3 Step 16 Metrics |
| 17 | FIG. 3 Step 17 Theme |
| 18 | FIG. 3 Step 18 Platform Tasks |
| 20 | FIG. 1 Step 20 Environmental Information Refer to FIG. 3 |
| 21 | FIG. 2 Step 21 Hardware |
| 22 | FIG. 2 Step 22 Network |
| 23 | FIG. 2 Step 23 Software |
| 30 | FIG. 3 Step 30 Defined Criteria |

PREFERRED EMBODIMENT—DESCRIPTION

The figures described below constitute one way the invention's components might be constructed. The customizable nature of this method and its components enables the various components to be assembled as required to support individual business user environments, and various customized versions could utilize the components in selected manners.

In FIG. 1, Step 1, Control Mechanism 1 is the coordinating and management component, and it provides interfaces with various other components as they are selected to be processed by FIG. 3 Step 30, Defined Criteria 30. Control mechanism 1 also provides access to FIG. 3 Step 18 Task 18; and FIG. 3, Step 11 Regression Baselines and Timeslices 11 information. It also provides access to FIG. 2, Step 21 Hardware information 21; FIG. 2, Step 22 Network Information 22: and FIG. 2, Step 23 Software information 23.

Control Mechanism 1 and all other components may provide access to FIG. 1

Step 10, Storage Area 10 shown in further detail in FIG. 3 that stores information related to various processes. Control information, however, once prepared, is managed by Control Mechanism 1 and provided to each component as required.

Control mechanism 1 provides the methods to order and aggregate information from components in FIGS. 1, 2, 3, and 4 of the drawings, particularly from the entry of Defined Criteria 30. It provides the method to build a unique FIG. 3 Step 17 Regression and Verification Theme 17. Control Mechanism 1 provides the completed Theme 17 to FIG. 1, Step 2, Performance Mechanism 2 for processing.

Performance Mechanism 2 and Theme 17 [from Control Mechanism 1], including pointers to/or Task(s) 18, Defined Criteria 30, and Regression Baseline Detail and Timeslices 11, are included to provide FIG. 3 Step 19, Platform 19 to be exercised and FIG. 3, Step 13, Platforms Exercised. Platform 19 could include new or enhanced hardware 21, network 22 and/or software 23 components. Performance Mechanism 2 provides the method to execute the business user technology processes and then provides the method to return selected information to Storage Area 10, associated with various FIG. 3, Step 12, Key Constructs 12, as directed by theme 17, for use by FIG. 1, Step 3 Regression Evaluator 3.

Regression Evaluator 3 provides the method to conduct a variety of operations using information from Performance Mechanism 2 and Key Constructs 12 as directed by Theme 17. Evaluator 3 provides mechanisms to review performance information and compare it to information in Regression Baselines and timeslices 11. Every timeslice comparison may generate errors and deviations 14 that will be classified, tabulated and reported by following components. This mechanism provides Evaluator 3, FIG. 3 Step 14 Errors and Deviations 14 to Storage Area 10, which provides the mechanism to associate the information with various Key Constructs 12 and Regression Baselines and timeslices 11. Regression Baselines and Timeslices 11 also provides mechanisms to support generational logs of Errors and Deviations 14.

FIG. 1 Step 4 Results and Regression Classification 4 provides the method to access Regression Baselines and Timeslices 11, Errors and Deviations 14, and Key constructs 12. This process provides mechanisms to match, categorize, and classify information created by Performance Mechanism 2, Regression Evaluator 3, theme 17, and with Regression Baselines and Timeslices 11. This classification information is stored with Regression Baselines and Timeslices 11 for use by the FIG. 1 Step 5 Results and Regression Tabulation 5 process.

Tabulation 5 provides the mechanism to access Regression Baselines and Timeslices 11 that were updated by Evaluator 3 and Classification 4. Tabulation 5 provides mechanisms to identify and count classification 4 information using theme 17 and store the counts in FIG. 3 Step 16 Regression Metrics 16.

FIG. 4 Step 6 Results and Recommendations 6 provides the mechanism to of actions and Improvements of FIG. 3, Step 15 Recommendations 15, and then store them by timeslice and Key constructs 12 in Regression Baselines and Timeslices 11. The wording of the Recommendations, Actions, and Improvements was previously identified and entered into and maintained as part of Defined Criteria 30. This step prepares pointers to selected wording based upon Theme 17.

FIG. 4, Step 7 Results Reports 7 provides formatted reporting information. It provides mechanisms to store the reporting detail information itself in Regression Baselines and Timeslices 11 by timeslice and Key Constructs 12 according to Theme 17 and to maintain complete regression information on all activities. Results Reports 7 then provides mechanisms to print selected reports according to Theme 17.

PREFERRED EMBODIMENT—OPERATION

Operation of the technology regression and verification acceptance method is further described with reference to FIGS. 1 through 4 and Reference Numerals to indicate.

The present invention is a method of managing and building a collection of instructions to perform acceptance and regression verifications of various combinations of hardware, network and/or software elements, depending upon the particular environment in which it is used. Each of the acceptance and regression verification components and comparative algorithms may be developed with a variety of techniques in order to perform the selected methodology alone or be inter-connected in order to process the acceptance and regression verification based upon defined criteria 30 and theme 17.

Information in defined criteria 30 is incorporated in theme 17 and directs the unique processing which take place in this method's components, defining the particular holistic universe that will be reviewed, including environmental hardware, network, and/or software. Defined criteria 30 and theme 17 include instructions for managing the handling of Regression Baselines and Timeslices 11.

The operation of the components of this invention is based upon comparative algorithms and pointer creation, which utilize information prepared by exercising the business user customer's technology platform. Subsequent information is maintained in the regression baselines and timeslices 11, Key constructs 12, and Theme 17.

When the components of this invention exercise the hardware, network, and software in the unique customer environment, selected activities are managed and guided by Theme 17.

The method of this invention thus enables the business user customer to ensure that the results they see are exact reflections of the operations of their individual unique production technology platforms. Further, they are able to retain and review regression details in customizable reports as selected.

Presentation of Results Reports 7 management reports to the business user customer enables them to make important management decisions as to the acceptance of the technology enhancements incorporated in the Theme 17 execution. The business user customer may decide to implement recommendations 15 provided by this acceptance and regression method. The business user customer may make determinations based upon the results reports 7 and metrics 16 provided.

OTHER EMBODIMENTS

INTERNAL INFORMATION—DESCRIPTION

Internal information is used by the present invention to manage unique [business user] environments which will be evaluated during processing using the instructions from Defined Criteria 30 and subsequent Theme 17, to provide business user customer acceptance status. Information includes:

(a) Defined Criteria 30, including high level instructions identifying the business user customer's environments and scope of the selected area to be evaluated. This information is managed by Control Mechanism 1, maintained in Storage Area 10 and used to create Theme 17. Defined Criteria 30 also contains customer defined error messages and customized pointer criteria.

(b) Theme 17, including pointers to hardware 21, network 22, and software 23 environmental information, and regression and timeslice 11 information. Theme carrying instructions to every selected component and Task 18 enable Performance Mechanism 2 to process. The type of classification selected is indicated in Theme 17. It relates information such as errors and deviations to pointers and selected reporting categories. Theme 17 also contains tabulation and classification instructions based upon defined criteria 30 which cause information prepared in the classification 4 and tabulation 5 components to be associated with key constructs 12.

(c) Key constructs 12 contain customized business user customer selected structure and instructions for their management.

(d) Regression Baselines and Timeslices 11 contain business information associated with a specific business user customer's operating environment at various points in time. Information includes details which have been selected to represent normal business processing with special attention to month end, quarter end, year and end time periods. This business information reflects the condition of information supporting every timeslice selected to be managed. Other information prepared during the performance of this invention is uniquely related to its selected timeslice, its Key Constructs 12, Errors and Deviations 14, Recommendations 15, Metrics 16, Hardware 21, Network 22, Software 23, and Platforms Exercised 13.

(e) Errors and Deviations 14 information consists of pointers to both the causative business information and timeslice, and the particular Defined Criteria 30 message chosen by the business user customer according to Theme 17.

(f) Reporting 7 information consists of pointers to areas to be reported based upon Defined Criteria 30 and Theme 17.

INTERNAL INFORMATION—OPERATION

During the operation of the components of this invention, Control Mechanism 1 establishes working parameters for the specific component execution by establishing Theme 17.

Once Control Mechanism 1 prepares Theme 17, each specified component obtains and uses its parts of Defined Criteria 30 [now] from theme 17 to limit or expand the scope of the operation being conducted and the type of results that are expected.

Performance Mechanism 2 initiates the business user customer's technology platform 19. When the business user customer's processes are completed, it returns process execution information to storage area 10 as directed by theme 17, pointers, and Platforms Exercised 13.

Regression Evaluator 3, using instructions from Theme 17, compares information between selected baselines and timeslices 11 and prepares pointer information that identify errors and deviations 14 and selected information in Key Constructs 12.

Results and Regression Classification 4, using instructions from Theme 17, associates the errors and deviations 14 with selected baselines and timeslices 11 using pointers.

Results and Regression Tabulation 5, using instructions from Theme 17, counts the occurrences of the errors and deviations 14 and associates the counts with selected categories using selected pointers.

Results and Recommendations 6 creates pointers from each error or deviation to the appropriate selected messages maintained in defined criteria 30.

Results Reports 7, using Theme 17, selected instructions, and pointers, and then formats selected information and prints reports. If selected this could be on paper, to disk or others selected media.

CONCLUSIONS, RAMIFICATIONS, AND SCOPE

Accordingly, it can be seen that this method and its components is a unique innovative way to verify information technology enhancements in support of business user customers. This includes providing them timely, cost-effective complete regression and verification review with acceptance status reporting information they can use to make informed acceptance decisions.

Although the description above contains many specifics, these should not be construed as limiting the scope of the method but as merely providing illustrations of some of the presently preferred embodiments of this method.

Thus the scope of the invention should be determined by the claims and their legal equivalents, rather than by the examples given.

What is claimed is:

1. A regression and verification system in a computer network environment, the system comprising:

a plurality of hardware, software and network platforms available to be exercised;

a storage area containing at least defined criteria data, theme data, regression baselines and timeslice information;

error and deviation data;

a plurality of recommendations based upon said theme;

a control mechanism for managing an acceptance and regression verification process;

a performance mechanism for exercising a selected customer's technology utilizing instructions and pointers in said theme to direct the performance mechanism;

a regression evaluator mechanism, operating as directed by said theme, for identifying errors, deviation and performance information for comparison and then comparing the evaluated information from the exercising of the platforms with said regression baselines and timeslices;

a classification mechanism for classifying said errors, deviation and performance information as directed by said theme;

a tabulation mechanism for tabulating said errors, deviation and performance information as directed by said theme;

a recommendation mechanism for identifying actions and improvement steps as directed by said theme based upon the errors, deviations and other regression information;

a results reporting mechanism for providing information reflecting the results of said performance mechanism, regression evaluation mechanism, classification mechanism, tabulation mechanism and recommendation mechanism as directed by said theme.

2. The regression and verification system of claim 1, further comprising:

wherein said theme data comprises instructions and pointers maintained in said storage area which directs the operation of the system at a selected point in time;

wherein said criteria and theme data comprises technology parameters, selections, messages, instructions and pointers.

3. The regression and verification system of claim 2, further comprising:

wherein the recommendation are derived from error and deviation data and pointers to regression baselines and timeslices.

4. The regression and verification system of claim 1, further comprising:

a plurality of metrics based upon said theme.

5. The regression and verification system of claim 1, further comprising:

a plurality of platform tasks based upon said theme.

6. The regression and verification system of claim 1, further comprising:

a plurality of key constructs defining the relationships between items of information as selected by said theme.

7. The regression and verification system of claim 1, further comprising:

wherein, the information provided by the results reporting mechanism determines the status of the computing environment.

8. The regression and verification system of claim 1, further comprising:

a user interface for allowing the exchange of information between the user and the system;

wherein the user interface allows manipulation of the information stored in said storage area.

9. The regression and verification system of claim 1, further comprising:

wherein said error and deviation data comprises the results of comparison algorithms and pointers to regression and timeslices based upon said theme.

\* \* \* \* \*